(12) United States Patent
Araki

(10) Patent No.: US 12,182,462 B2
(45) Date of Patent: Dec. 31, 2024

(54) IMAGE FORMING APPARATUS FOR DETERMINING ORDER OF PROCESSING MULTIPLE REQUESTS

(71) Applicant: CANON KABUSHIKI KAISHA, Tokyo (JP)

(72) Inventor: Yuichiro Araki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/492,523

(22) Filed: Oct. 23, 2023

(65) Prior Publication Data

US 2024/0134581 A1 Apr. 25, 2024
US 2024/0231718 A9 Jul. 11, 2024

(30) Foreign Application Priority Data

Oct. 25, 2022 (JP) .................................. 2022-170312

(51) Int. Cl.
*G06F 3/12* (2006.01)
*H04L 67/02* (2022.01)

(52) U.S. Cl.
CPC .......... *G06F 3/1236* (2013.01); *G06F 3/1203* (2013.01); *G06F 3/128* (2013.01); *G06F 3/1286* (2013.01); *G06F 3/1287* (2013.01); *G06F 3/1288* (2013.01); *H04L 67/02* (2013.01)

(58) Field of Classification Search
None
See application file for complete search history.

(56) References Cited

U.S. PATENT DOCUMENTS

2021/0270520 A1* 9/2021 Yang ...................... G06Q 10/08

FOREIGN PATENT DOCUMENTS

JP 2014092889 A 5/2014

* cited by examiner

*Primary Examiner* — Eric A. Rust
(74) *Attorney, Agent, or Firm* — Canon U.S.A., Inc. IP Division

(57) ABSTRACT

An application of a communication apparatus includes an identification unit configured to identify a communication line through which a first request and a second request are received, and a determination unit configured to identify communication endpoints having received the first request and the second request, and determine whether the communication endpoints are same, wherein, in a case where the determination unit determines that the communication endpoints having received the first request and the second request are not same communication endpoints and the identification unit determines that a communication line having received the first request and the second request is the first communication line, the first request and the second request are processed as a series of requests in a same session.

7 Claims, 10 Drawing Sheets

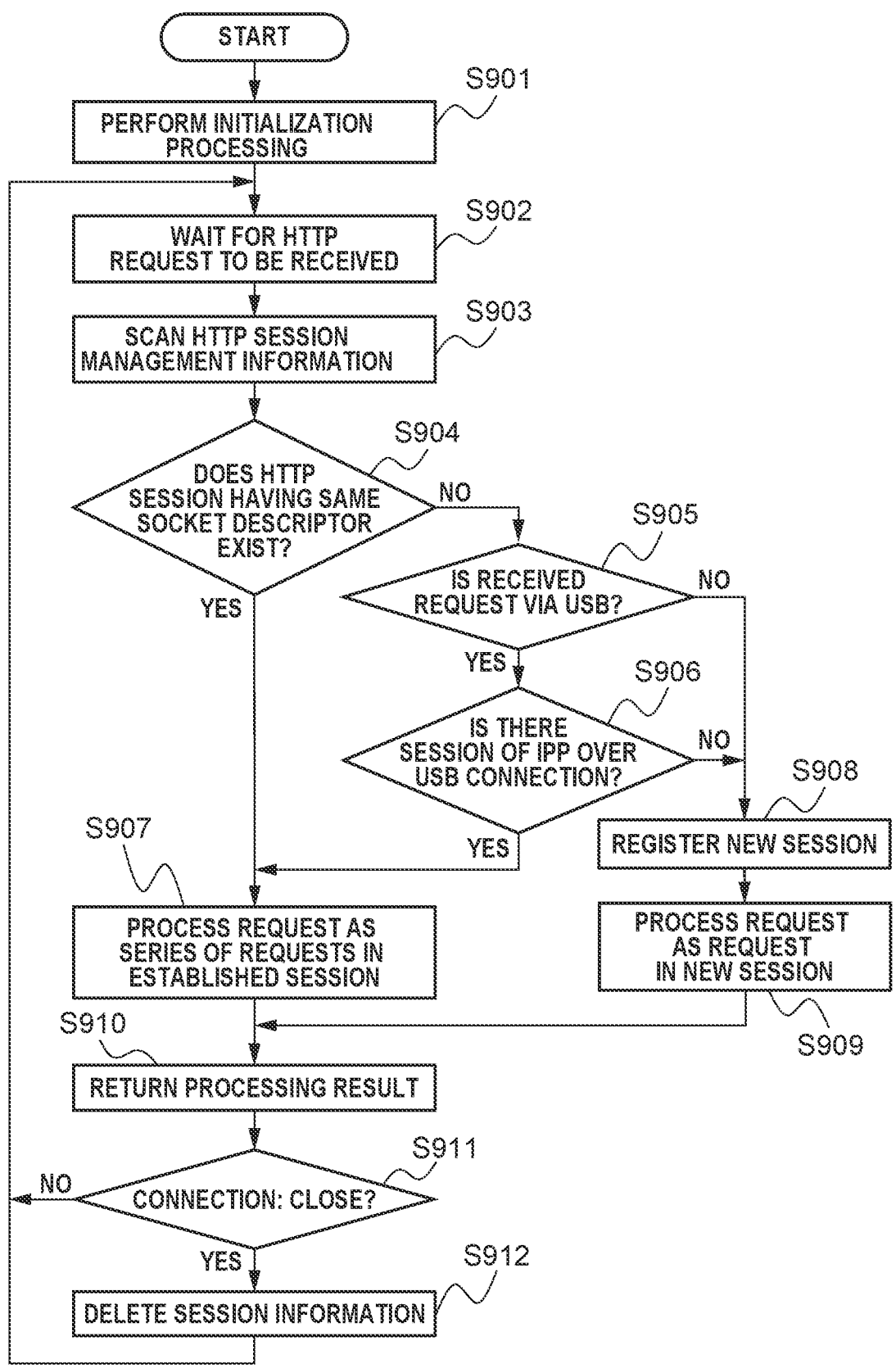

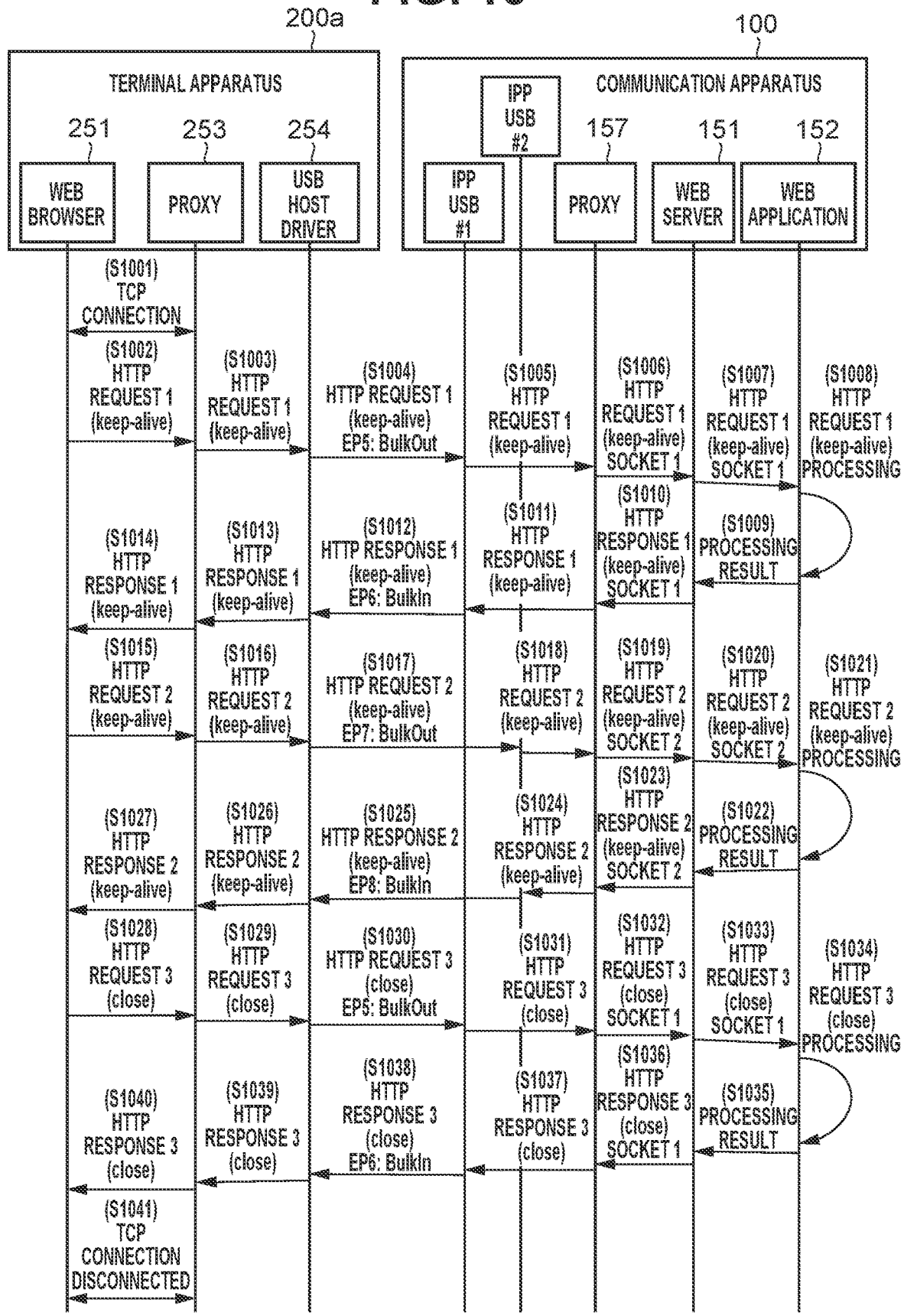

IMAGE FORMING APPARATUS FOR DETERMINING ORDER OF PROCESSING MULTIPLE REQUESTS

BACKGROUND

Field

The present disclosure relates to a communication apparatus and a method for controlling a communication apparatus.

Description of the Related Art

Conventionally, there is a technique for accessing a web server built in a communication apparatus, such as an image forming apparatus, from a web browser on a terminal apparatus, such as a personal computer or a smartphone, using HyperText Transfer Protocol (HTTP) communication. In HTTP/1.1, a series of HTTP communications can be continued while a session is maintained by a Keep-Alive function, and this function is used in many web applications.

Internet Printing Protocol (IPP) is known as a communication protocol that extends HTTP and controls a printer over an Internet Protocol (IP) network.

As a method of performing HTTP communication including IPP via a universal serial bus (USB), a standard called IPP over USB is known.

In a USB, one collective functional block is called an interface, which includes one or more logical channels called endpoints (hereinafter EPs). As a result, a plurality of communication paths can be formed using the USB, which is physically serial communication. Japanese Patent Application Laid-Open No. 2014-92889 discusses a configuration for preventing an increase in communication time even when an HTTP request is received from each of a plurality of client applications via one endpoint.

When a communication apparatus provides a service to an external terminal apparatus by HyperText Transfer Protocol (HTTP) communication, it is possible to ensure consistency of processing while an HTTP session is maintained using the Keep-Alive function of HTTP. For example, in the case of a service that does not support a multi-session, it is conceivable to perform exclusive processing of the service by prohibiting an HTTP request to the service from a session other than the established HTTP session. In the case of a multi-session supported service, it is conceivable to manage the state of an HTTP client for each HTTP session.

However, in a communication apparatus including a plurality of interface descriptors compliant with IPP over USB, depending on a behavior of a USB-connected terminal apparatus, a series of HTTP requests for which a session is to be maintained may be received at different endpoints. In this case, it is difficult to determine whether a plurality of HTTP communications is in the same session, and inconsistency may occur in exclusive control of services or HTTP session management. In other words, in a case where a service maintaining an HTTP session is executed, it is necessary to appropriately implement the HTTP session management. Japanese Patent Application Laid-Open No. 2014-92889 does not refer to such an issue, and therefore effective solving means has not been considered.

SUMMARY

According to various embodiments of the present disclosure, a communication apparatus that performs communication with a terminal apparatus using a request/response protocol, the communication apparatus includes a server unit configured to receive a request and transmit a response via a first communication line including at least two logical interfaces and a second communication line different from the first communication line, and an application configured to process a predetermined request, wherein the application includes an identification unit configured to identify a communication line through which a first request and a second request are received, and a determination unit configured to identify communication endpoints having received the first request and the second request, and determine whether the communication endpoints are same, and wherein, in a case where the determination unit determines that the communication endpoints having received the first request and the second request are not same communication endpoints and the identification unit determines that a communication line having received the first request and the second request is the first communication line, the first request and the second request are processed as a series of requests in a same session.

Further features of the present disclosure will become apparent from the following description of exemplary embodiments with reference to the attached drawings.

BRIEF DESCRIPTION OF THE DRAWINGS

FIG. 9 is a flowchart illustrating an operation of a web application according to the first exemplary embodiment.

FIG. 10 is a sequence diagram illustrating an example of an operation of a communication system according to the first exemplary embodiment.

DESCRIPTION OF THE EMBODIMENTS

Figure 1:
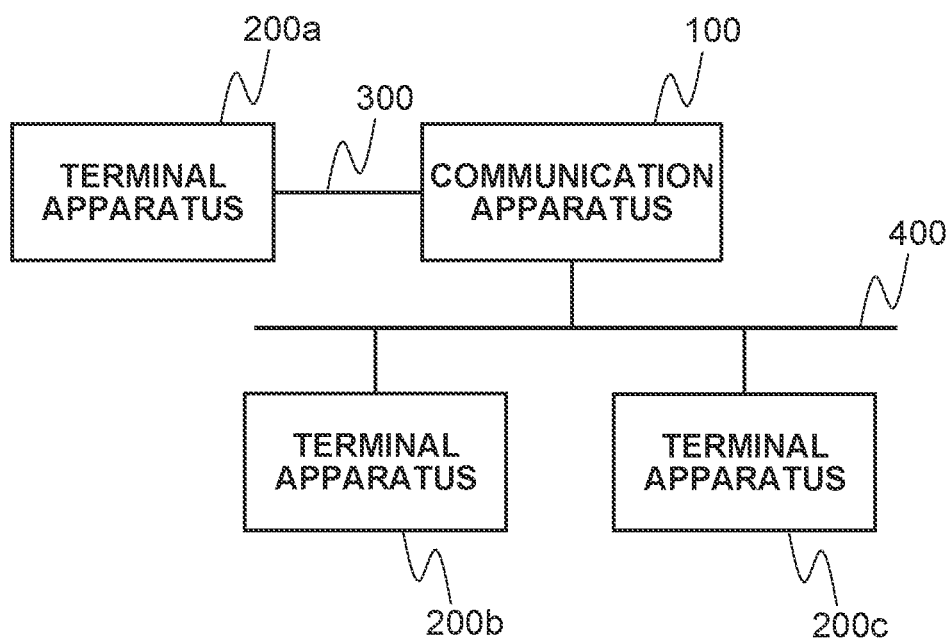
FIG. 1 is a diagram illustrating a configuration of a communication system according to a first exemplary embodiment.

Exemplary embodiments of the present disclosure will now be described with reference to the drawings. In the following drawings, identical or corresponding components are provided with the same reference numerals. The following exemplary embodiments are not intended to limit the present invention, and not all combinations of features described in the exemplary embodiments are always essential to the solution of every embodiment of the present disclosure.

First, the configuration of the first exemplary embodiment will be described with reference to FIGS. 1 to 5. FIG. 1 is a diagram illustrating a configuration of a communication system according to the present exemplary embodiment. A terminal apparatus 200a is connected to a communication apparatus 100 via a universal serial bus (USB) 300, and a terminal apparatus 200b and a terminal apparatus 200c are connected to the communication apparatus 100 via a local area network (LAN) 400. The communication apparatus 100 is a multifunction printer including an interface compliant with the Internet Printing Protocol (IPP) over USB standard, and a network connection function. Each terminal apparatus 200 is an information terminal apparatus, such as a tablet or a personal computer, having a USB host function and a network connection function.

In connection by the USB 300, the terminal apparatus 200a operates as a USB host, and the communication apparatus 100 operates as a USB device. The LAN 400 may be a wired LAN or a wireless LAN via an access point (not illustrated). In communication by LAN connection, an Internet Protocol (IP) address is assigned to each apparatus, and communication based on the Transmission Control Protocol/Internet Protocol (TCP/IP) is performed.

Figure 2:
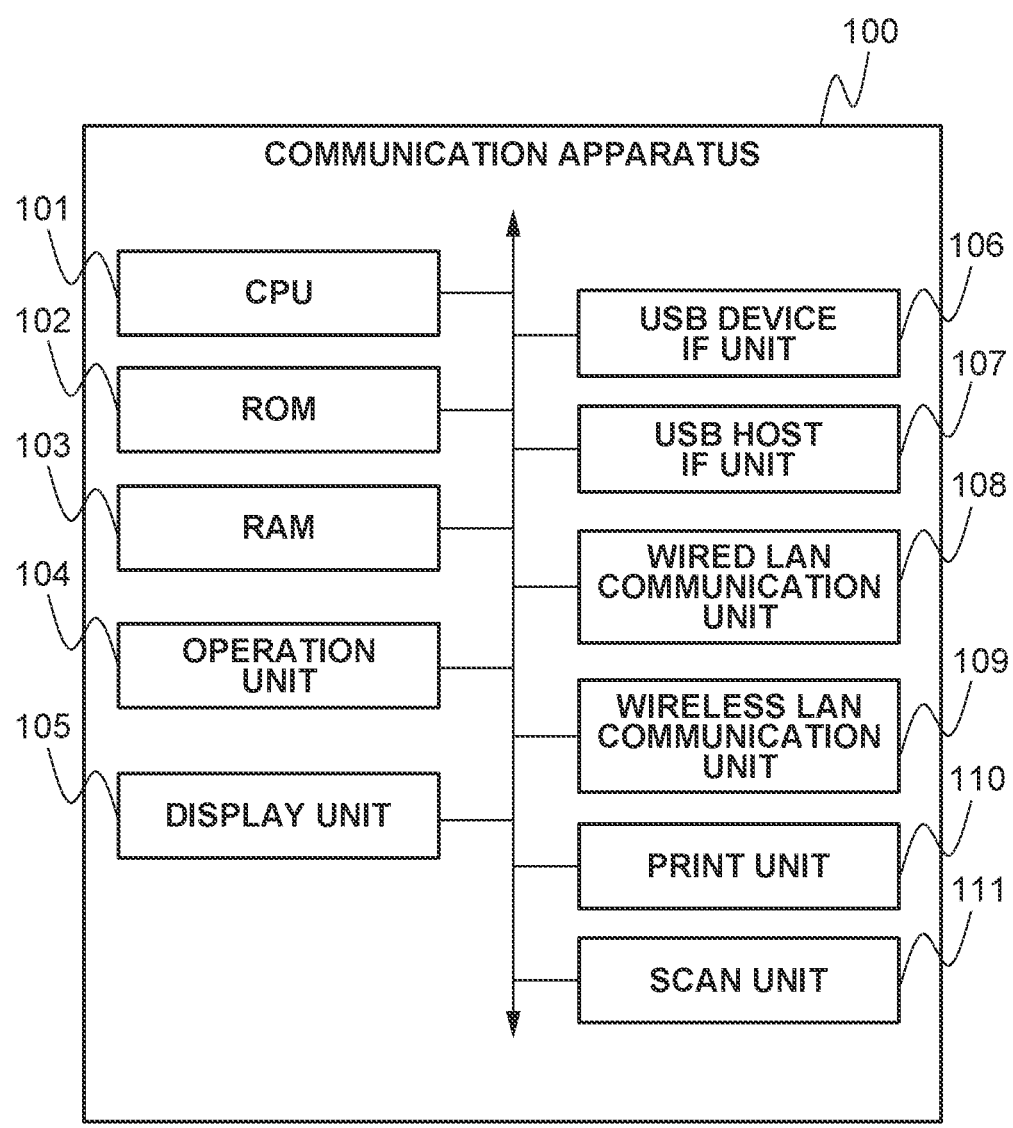
FIG. 2 is a block diagram illustrating a hardware configuration of a communication apparatus according to the first exemplary embodiment.

FIG. 2 is a block diagram illustrating a hardware configuration of the communication apparatus 100. The communication apparatus 100 includes a central processing unit (CPU) 101, a read only memory (ROM) 102, and a random access memory (RAM) 103, an operation unit 104, a display unit 105, a USB device interface (IF) unit 106, a USB host IF unit 107, a wired LAN communication unit 108, a wireless LAN communication unit 109, a print unit 110, and a scan unit 111.

The CPU 101 operates in accordance with a control program stored in the ROM 102 and contents of the RAM 103, and controls each unit described below. The ROM 102 stores an operating system (OS), a device driver, a library, and an application program for controlling the communication apparatus 100. The RAM 103 includes a static random access memory (SRAM), a dynamic random access memory (DRAM), and a non-volatile random access memory (NVRAM). The RAM 103 stores variables for operating a control program stored in the ROM 102, print data, scan data, and the like. Various setting values and accumulated values are stored in the NVRAM.

The operation unit 104 includes buttons and an operation panel, and receives an input operation from a user.

The display unit 105 displays a state of the communication apparatus 100 and a function selection menu on a display. In addition, a touch panel may be provided to also serve as the operation unit 104.

The USB device IF unit 106 includes a USB peripheral controller and performs USB communication with the external terminal apparatus 200. The USB host IF unit 107 is an interface that includes a USB host controller, and performs USB communication with devices, such as a digital camera and a USB memory.

The wired LAN communication unit 108 includes an Ethernet® controller and performs wired LAN communication by Ethernet® with the external terminal apparatus 200. The wireless LAN communication unit 109 includes a wireless LAN chip and an antenna, and performs wireless LAN communication by performing infrastructure connection with an external access point (AP) using the communication apparatus 100 as a station (STA) or performing direct connection with an external terminal apparatus as a software AP.

The print unit 110 prints print data and image data received from an external terminal apparatus on a recording medium. The scan unit 111 reads a document and generates image data.

Figure 3:
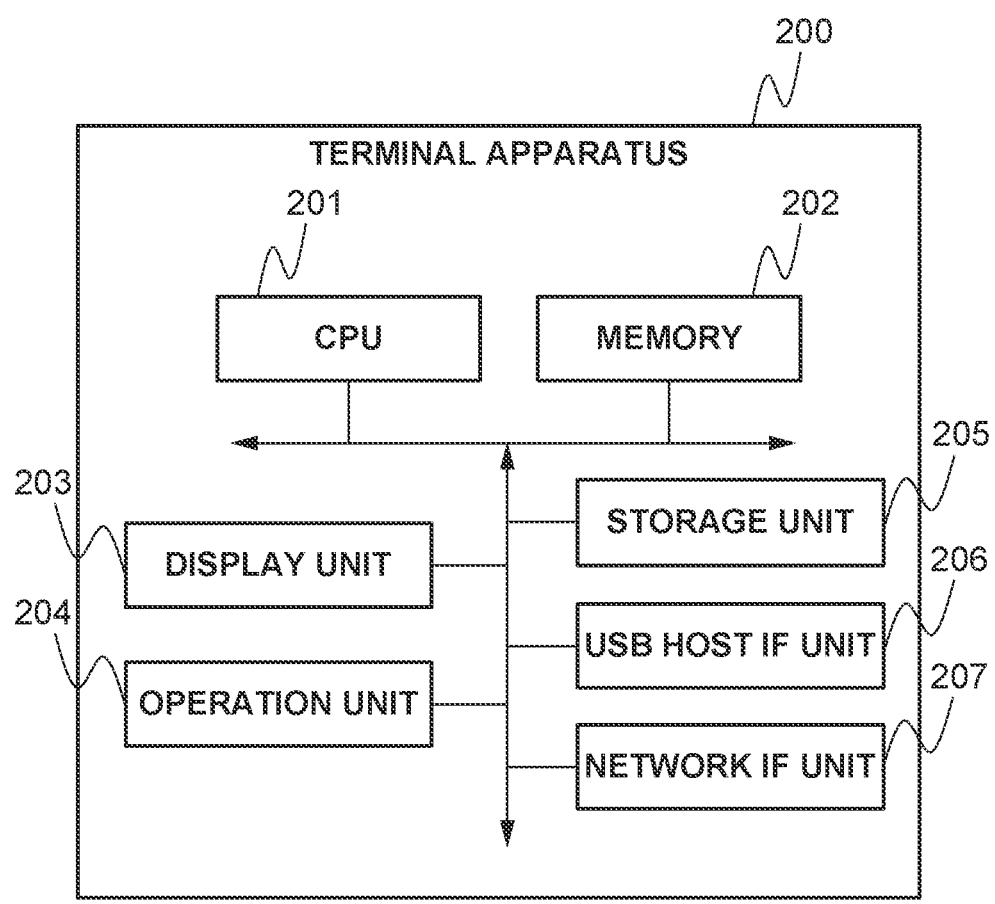
FIG. 3 is a block diagram illustrating a hardware configuration of a terminal apparatus according to the first exemplary embodiment.

FIG. 3 is a block diagram illustrating a hardware configuration of the terminal apparatus 200. The terminal apparatus 200 includes a CPU 201, a memory 202, a display unit 203, an operation unit 204, a storage unit 205, a USB host IF unit 206, and a network IF unit 207.

The CPU 201 controls units of the terminal apparatus 200 by loading programs stored in the storage unit 205 into the memory 202 and executing the programs. The memory 202 is used as a main storage device for the CPU 201 to execute various processes, and stores the programs executed by the CPU 201 and data.

The display unit 203 includes a display device, such as a display, and a graphics processing unit (GPU) that drives the display device. In addition, the display may be externally attached via an interface, such as High-Definition Multimedia Interface® (HDMI). The operation unit 204 receives an input from a touch panel, or a keyboard or a mouse connected to the USB host IF unit 206.

The storage unit 205 is a non-volatile secondary storage device, such as a hard disk (HDD) or a solid state drive (SSD), and stores an operating system, various applications, various data, and the like in a hierarchical structure called a file system. The USB host IF unit 206 includes a USB host controller and is an interface for performing USB communication with various USB devices including the communication apparatus 100. The network IF unit 207 is an interface for performing network communication with various external apparatuses via a wired LAN using Ethernet® or a wireless LAN.

Figure 4:
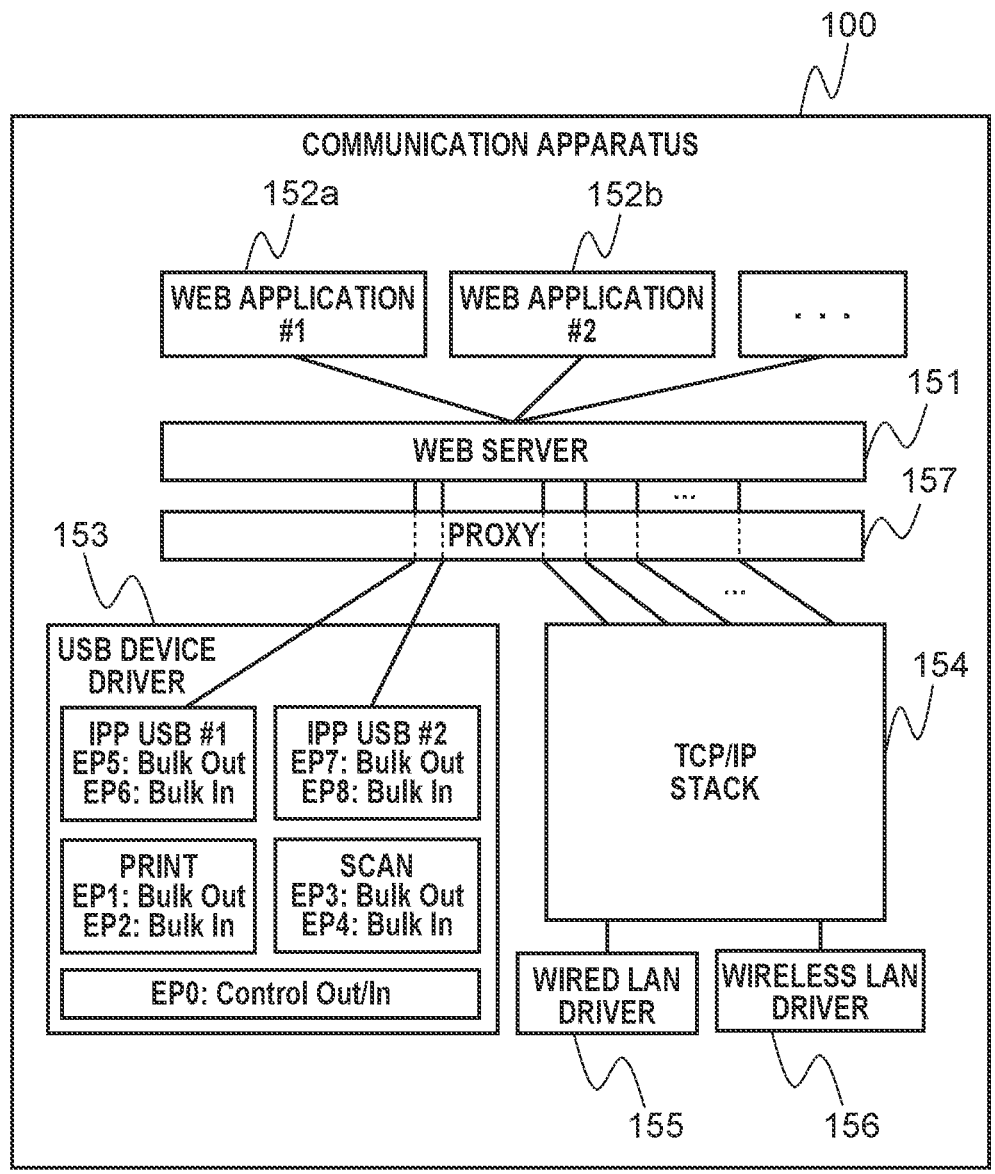
FIG. 4 is a block diagram illustrating a software configuration related to HyperText Transfer Protocol (HTTP) communication of the communication apparatus according to the first exemplary embodiment.

FIG. 4 is a block diagram illustrating a software configuration for HTTP communication of the communication apparatus 100. The communication apparatus 100 executes the following program stored in the ROM 102.

A web server 151 is a server program that performs communication using HTTP, and is a module that transmits an HTTP response in response to an HTTP request received from the terminal apparatus 200. The web server 151 has a multi-thread parallel server configuration and includes a main thread that waits for connection to be made by an HTTP client, and a plurality of sub-threads that transmits and receives a request/response after the connection with the HTTP client is established. When the plurality of sub-threads operate in parallel, multi-session communication becomes possible. The web server 151 generates a communication endpoint called a socket and communicates with the HTTP client. At this time, the HTTP session is managed with an identifier for the communication endpoint called a socket descriptor. The web server 151 can also perform secure communication using Transport Layer Security (TLS) called Hypertext Transfer Protocol Secure (HTTPS).

A web application 152 is a program to which processing is delegated from the web server 151 based on a Uniform Resource Identifiers (URI) of an HTTP request received by the web server. The web application 152 includes, for example, a print application, a scan application, a setting application, and a remote user interface (UI) application. The print application is an application that implements print processing in response to a request from the web server 151. Print settings and print data are stored in a predetermined format in a body of the received HTTP request, and the print application that has received them controls the print unit 110 to execute printing. The print application then notifies the web server 151 of whether the printing has been successful or has failed, error information, and the like.

The scan application is an application that implements scan processing in response to a request from the web server 151. Scan settings are stored in a predetermined format in the body of the received HTTP request, and the scan application that has received the scan settings controls the scan unit 111 to execute scanning. The scan application then notifies the web server 151 of whether the scanning has been successful or has failed, error information, and the like, and transmits scanned image data to the web server 151.

The setting application is an application that executes setting processing in response to a request from the web server 151. In the body of the received HTTP request, setting values are stored in a predetermined format. Examples of the setting values include system settings, such as automatic power on/off, and information related to network and security settings. The setting application that has received them stores the setting values in the NVRAM and notifies the web server 151 of whether a setting change can be executed, error information, and the like.

The remote UI application is an application that implements display and operation of a remote UI in response to a request from the web server 151. Data extracted from analyzed parameters of the HTTP request includes information about the remote UI to be displayed, and a language setting. As an example, in the case of a request to display the state of the communication apparatus, a remaining amount of ink in the print unit 110, and the like on the remote UI, the remote UI application collects and then formats necessary data from a state management module and the print unit 110 of the communication apparatus. Then, the remote UI application notifies the web server 151 of whether the display request can be executed, error information, the collected and formatted data, and the like.

A USB device driver 153 includes an interface including an endpoint 0 (EP 0) for performing control transfer, interfaces for printing and scanning, and two interfaces compliant with the IPP over USB standard.

Here, the printing interface includes a BulkOut transfer EP 1 and a BulkIn transfer EP 2, and the scanning interface includes a BulkOut transfer EP 3 and a BulkIn transfer EP 4.

Further, the two interfaces compliant with the IPP over USB standard are referred to as IPP USB #1 and IPP USB #2, respectively. Here, the IPP USB #1 includes a BulkOut transfer EP 5 and a BulkIn transfer EP 6, and the IPP USB #2 includes a BulkOut transfer EP 7 and a BulkIn transfer EP 8.

When printing is performed from the terminal apparatus 200a, print data is received via the printing interface (EP 1 and EP 2) when IPP is not used, and via the IPP USB #1 or IPP USB #2 when IPP is used. A TCP/IP stack 154 is a module that performs communication based on a TCP/IP protocol group, and provides an application programming interface (API) called a socket API to a network communication application.

A wired LAN driver 155 is a device driver that controls the wired LAN communication unit 108, and transfers transmission and reception frames between the TCP/IP stack 154 and the wired LAN communication unit 108. A wireless LAN driver 156 is a device driver that controls the wireless LAN communication unit 109, and performs authentication processing necessary for wireless connection and transfer of the transmission and reception frames between the TCP/IP stack 154 and the wireless LAN communication unit 109.

A proxy 157 is a module that provides the web server 151 with an API for handling USB communication equivalently to network communication. Specifically, two sockets are prepared for the IPP USB #1 and the IPP USB #2, and data transmitted and received via the USB is transmitted and received via the sockets. Thus, the web server 151 can perform communication without being aware of whether the communication is network communication or USB communication by performing transmission and reception via the proxy 157.

Figure 5:
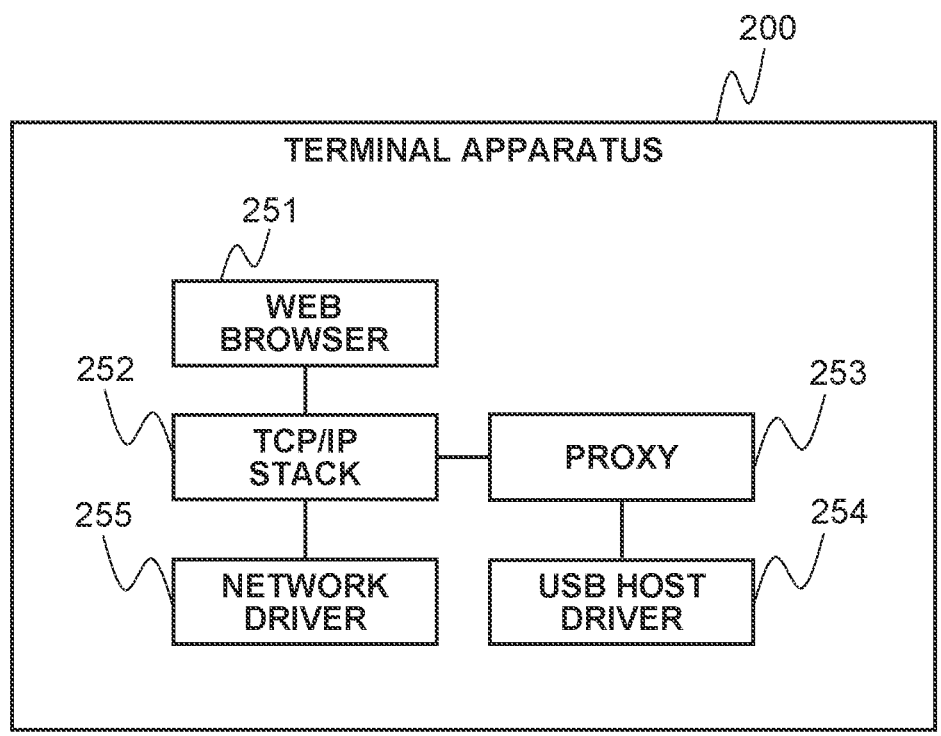
FIG. 5 is a block diagram illustrating a software configuration related to HTTP communication of a terminal apparatus according to the first exemplary embodiment.

FIG. 5 is a block diagram illustrating a software configuration for HTTP communication of the terminal apparatus 200. The terminal apparatus 200 executes programs, such as a web browser 251, a TCP/IP stack 252, a proxy 253, a USB host driver 254, and a network driver 255.

The web browser 251 is a general-purpose application program for browsing web sites on the Internet, and is used as a user interface for performing various settings on a remote UI of the communication apparatus 100.

The TCP/IP stack 252 is a library of the TCP/IP protocol group. The proxy 253 is a program that relays connection using HTTP between the TCP/IP stack 252 and the USB host driver 254, and acts as a server for a HTTP port of the localhost.

The USB host driver 254 is a program for controlling the USB host IF unit 206 to perform USB communication. The network driver 255 is a program for controlling the network IF unit 207 to perform network communication.

When the web browser 251 accesses the HTTP port (e.g., HTTP://localhost:80) of the localhost, the proxy 253 is requested to transmit screen data. The HTTP request sent to the proxy 253 is transmitted to the USB-connected communication apparatus 100 via the USB host driver 254. When the web browser 251 accesses a destination other than the HTTP port of the localhost, the HTTP request is transmitted via the network driver 255.

Figure 6A:
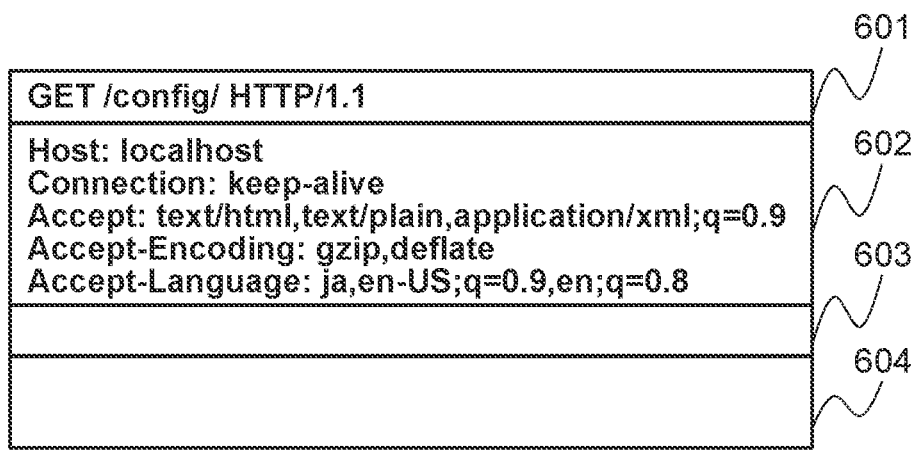
FIGS. 6A and 6B are diagrams illustrating an example of an HTTP request and an HTTP response according to the first exemplary embodiment.
Figure 6B:
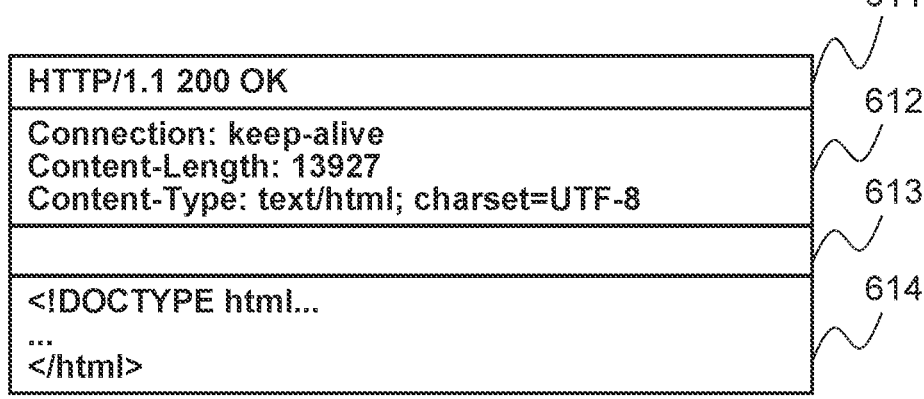

FIGS. 6A and 6B illustrate examples of an HTTP request and an HTTP response transmitted and received between the terminal apparatus 200 and the communication apparatus 100. FIG. 6A illustrates the example of the HTTP request transmitted by the terminal apparatus 200. The HTTP request includes a request line 601, a header 602, a blank line 603, and a text (or a body) 604.

The request line 601 includes an HTTP method, such as "GET" and "POST", a request target, and an HTTP version. In this illustrative example, the HTTP method is "GET", the request target is "/config/", and the HTTP version is "HTTP/1.1". The header 602 provides additional information to the server. In this example, "Host" indicating the destination is "localhost", and "Connection" indicating the connection state is "keep-alive" meaning connection is maintained.

The blank line 603 is provided for separating the header 602 from the text 604, and the blank line 603 indicates that the header 602 ends just before it. The text 604 is used when there is a text in the HTTP request.

FIG. 6B is an example of an HTTP response transmitted by the communication apparatus 100 in response to the HTTP request illustrated in FIG. 6A. The HTTP response includes a status line 611, a header 612, an empty line 613, and a text (or a body) 614. The status line 611 includes a protocol version, a status code, and a status character string. In this illustrative example, the protocol version is "HTTP/1.1", the status code is 200, and the status character string is "OK".

The header 612 provides information about the transmitted data to the client. In the case of this illustrative example, the connection state is "keep-alive" meaning connection is maintained, the length of the text is 13927 bytes, and the type of text is text data in an HTML format.

The empty line 613 is provided for separating the header 612 from the text 614, and the empty line 613 indicates that the header 612 ends just before it. The text 614 is used when there is a text in the HTTP response. In this example, HTML data having 13927 bytes is transmitted as the text.

The operation of the web server in the present exemplary embodiment will be described with reference to FIGS. 7 to 10.

Figure 7:
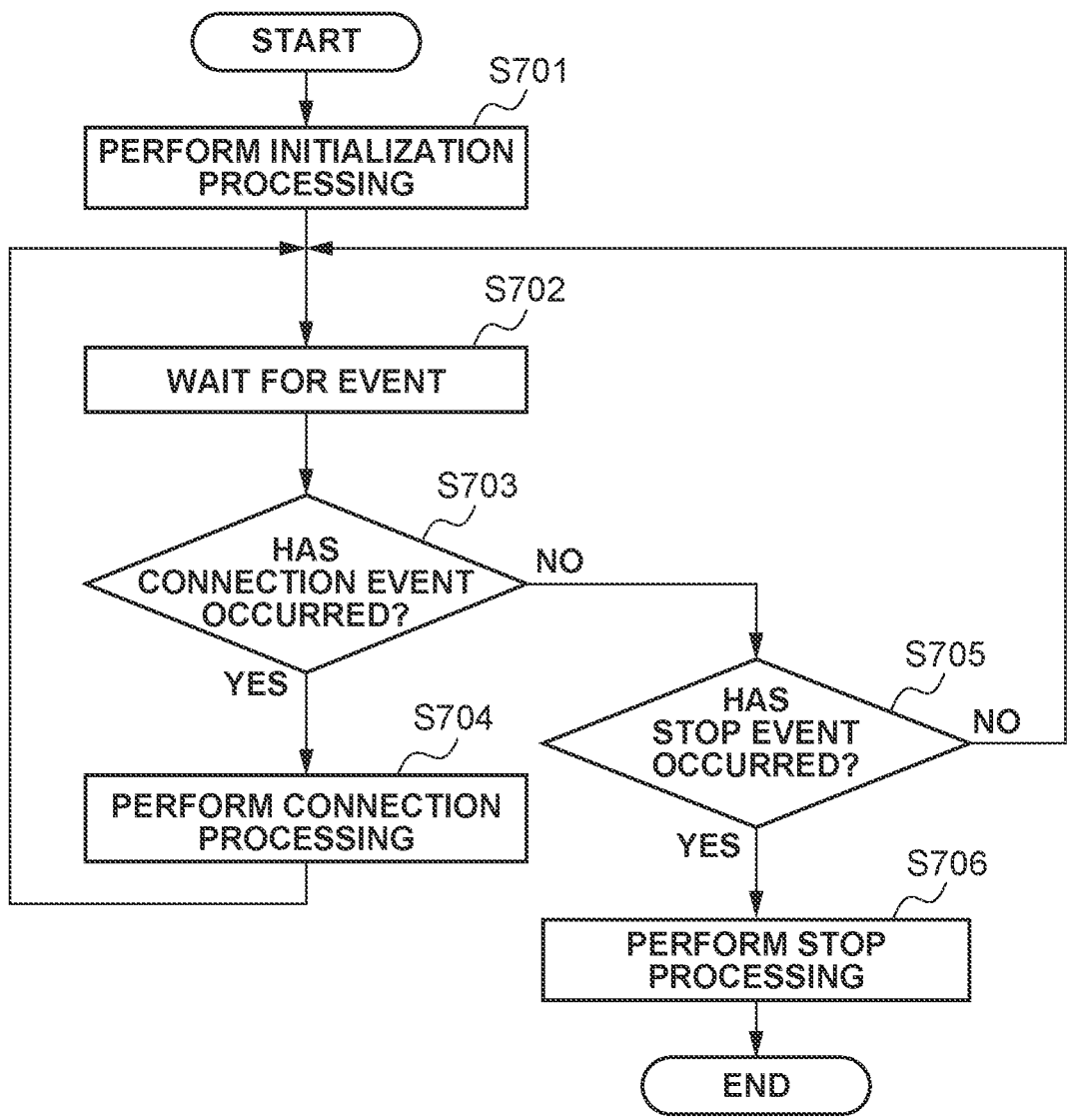
FIG. 7 is a flowchart illustrating an operation of a main thread of a web server according to the first exemplary embodiment.

FIG. 7 is a flowchart illustrating operation of a main thread of the web server 151 of the communication apparatus 100. This flowchart starts when the communication apparatus 100 is powered on and the web server 151 is activated.

First, in step S701, initialization processing of the web server 151 is performed. The initialization processing of the web server 151 includes initialization processing of an area of the RAM 103, initialization of the proxy 157, generation of a socket for waiting, and generation and queuing of a sub-thread. Here, the web server 151 may wait for connection via a plurality of communication paths, such as a TCP port 80 and a TCP port 443, using the TCP/IP stack 154. In general, the TCP port 80 waits for an HTTP request in plain text communication, and the TCP port 443 waits for an HTTP request in encrypted communication. Further, the HTTP request is waited for not only via the TCP communication but also via the USB communication using the USB device driver 153.

Subsequently, in step S702, the web server 151 waits for a connection event issuing an instruction to start connection or communication, or a stop event issuing an instruction to stop the web server. For example, in a case where connection from the external terminal apparatus 200 is detected at the TCP port 80, a connection event occurs. If the connection event has occurred (YES in step S703), the processing proceeds to step S704. If an event other than the connection event has occurred (NO in step S703), the processing proceeds to step S705.

If the connection event has occurred in step S703 (YES in step S703), in step S704, connection processing is performed. In the connection processing, reception processing of a connection request from the HTTP client is performed, and an obtained socket descriptor is passed to the head sub-thread of a sub-thread queue. Then, the process returns to waiting for an event in step S702.

If an event other than the connection event has occurred in step S703 (NO in step S703), in step S705, it is determined whether the event is a stop event. If a stop event instructing the web server to stop occurs (YES in step S705), the processing proceeds to step S706. The stop event occurs when the communication apparatus 100 is disconnected from the IP network (for example, when the communication apparatus 100 is powered off). Then, in step S706, stop processing of the web server is performed, and the processing ends. If an event that is neither a connection event nor a stop event occurs in step S702, the determination is NO in step S703, and the determination is NO in step S705, and thus the processing waits for an event in step S702 again.

Figure 8:
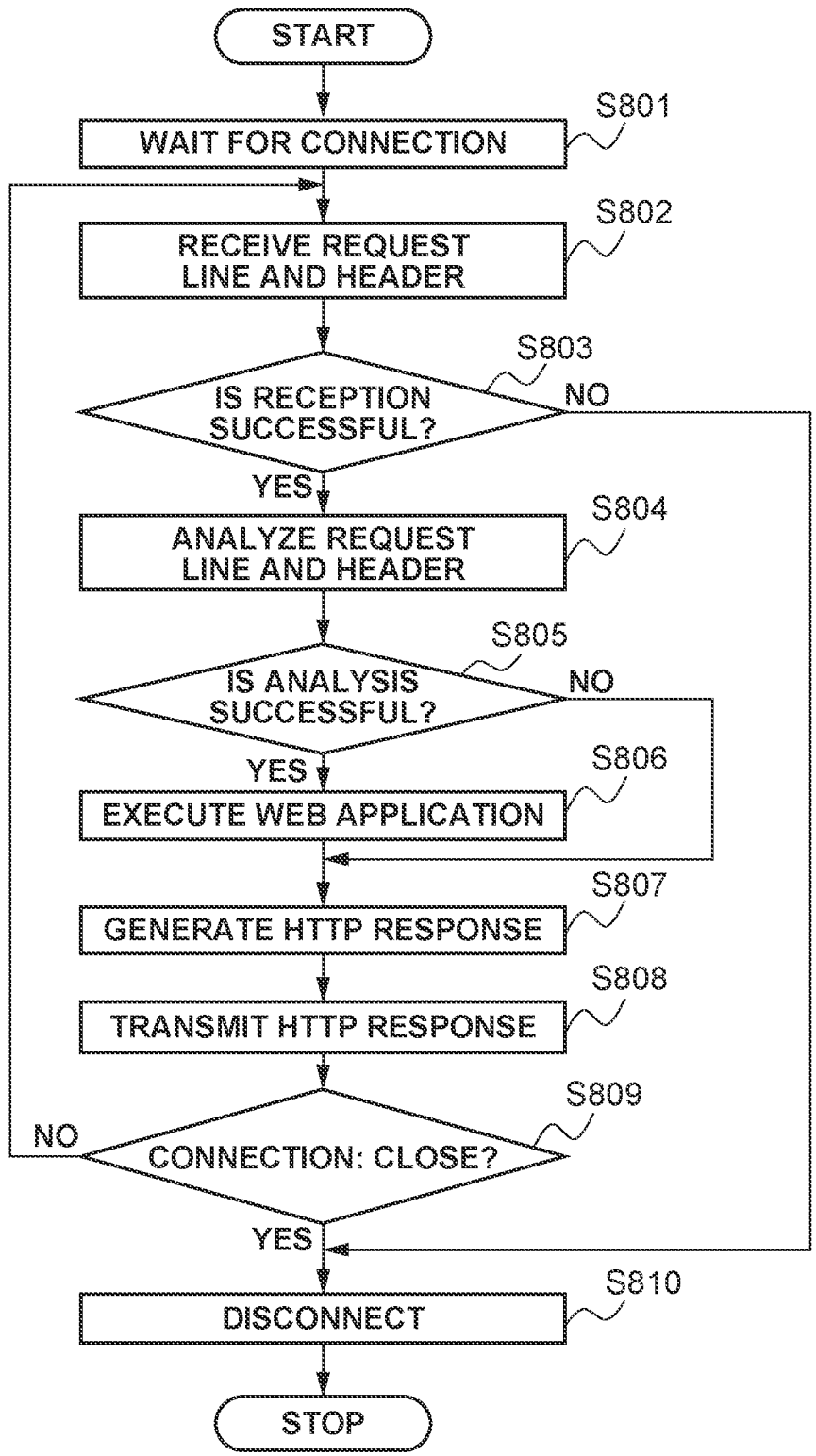
FIG. 8 is a flowchart illustrating an operation of a sub-thread of a web server according to the first exemplary embodiment.

FIG. 8 is a flowchart illustrating operation of a sub-thread of the web server 151. The flowchart starts when the main thread of the web server 151 generates the sub-thread in step S701. When the sub-thread is generated by the main thread, in step S801, the sub-thread waits for connection as a connection wait. The sub-thread is managed by the main thread in a queue, and when a connection event occurs in the main thread, the connection waits for the head sub-thread waiting in the sub-thread queue is released, and the processing proceeds to a reception process of step S802. At this time, the socket descriptor is passed from the main thread to the sub-thread.

In step S802, a request line and a header are received. As described with reference to FIGS. 6A and 6B, since the end of the header of the HTTP request can be detected with the blank line 603, the HTTP request may be received until the blank line 603 is detected. If the reception is successful in step S803, the processing proceeds to step S804 (YES in step S803), and if the reception fails, the processing proceeds to step S810 (NO in step S803).

Subsequently, in step S804, the request line and the header are analyzed. If the analysis is successful in step S805 (YES in step S805), the processing proceeds to step S806. If an error occurs in the S804, the analysis fails (NO in step S805), and the processing proceeds to step S807. Subsequently, in step S806, execution of processing of the HTTP request is delegated to the web application. At this time, the socket descriptor when the HTTP request is received and the analyzed parameter of the analyzed HTTP header are passed. The execution of processing in the web application in step S806 will be described with reference to FIG. 9.

In step S807, an HTTP response is generated in accordance with an execution result of the web application in step S806 if the analysis is successful in step S805, or in accordance with an analysis result if the analysis has failed in step S805. Then, in step S808, an HTTP response is transmitted to the socket descriptor when the HTTP request is received. As a result, the terminal apparatus 200 that has transmitted the HTTP request receives the HTTP response.

Subsequently, in step S809, if a Connection header of the returned HTTP response is "close" indicating disconnection (YES in step S809), the processing proceeds to step S810. If the Connection header of the returned HTTP response is not "close" (NO in step S809), the processing returns to step S802 to receive the next HTTP request.

If the determination is YES in step S809, the connection is disconnected by closing the socket or the like in step S810. Here, in the case of the socket assigned for the IPP over USB communication, the socket is not actually closed, but is merely brought into an unused state by the proxy 157.

The sub-thread is placed at the end of the sub-thread queue when the processing stops.

FIG. 9 is a flowchart illustrating operation of the web application 152 according to the present exemplary embodiment. The flowchart starts when the communication apparatus 100 is powered on and the web application 152 is activated.

First, in step S901, initialization processing is performed. In the initialization processing, an area used by the web application 152 in the RAM 103 and HTTP session management information are initialized. Next, in step S902, the web application 152 waits for an HTTP request from the web server 151 to be received. A socket descriptor and an analyzed parameter of the HTTP header are received from the web server 151, and then, in step S903, the web application 152 scans the HTTP session management information. The HTTP session management information is a table that manages connection information (a socket descriptor, an IP address, a port number, and the like), a state of an HTTP client, a progress status of a command, and the like.

As a result of the scanning in step S903, in step S904, it is determined whether an HTTP session having the same socket descriptor as the socket descriptor when the HTTP request is received in step S902 exists in the HTTP session management information. With the same socket descriptors, it is guaranteed that both HTTP sessions use the same communication line (USB or LAN). If there is an HTTP session having the same socket descriptor (YES in step S904), the processing proceeds to step S907.

If the HTTP session management information does not include an HTTP session having the same socket descriptor as the socket descriptor when the HTTP request is received in step S902 (NO in step S904), the processing proceeds to step S905.

When the processing proceeds to step S905, it is determined whether the socket descriptor when the HTTP request is received in step S902 is a socket descriptor for IPP over USB communication. If the socket descriptor is for IPP over USB communication (YES in step S905), the processing proceeds to step S906. If the socket descriptor is not for IPP over USB communication (NO in step S905), i.e., if the socket descriptor is received via the network, the processing proceeds to step S908.

When the processing proceeds to step S906, it is determined whether there is a session of IPP over USB connection in the HTTP session management information. If there is such a session (YES in step S906), the processing proceeds to S907, and if there is no such session (NO in step S906), the processing proceeds to S908.

If the processing proceeds to step S907 as a result of the determinations in steps S904, S905, and S906, there is an already established HTTP session. Thus, the HTTP request received in step S902 is processed as a series of requests in the corresponding HTTP session.

On the other hand, if the processing proceeds to step S908 as a result of the determinations in steps S904, S905, and S906, the session is registered as a new HTTP session in the HTTP session management information, and in step S909, the HTTP request is processed as a request in the new HTTP session. After the processing of the HTTP request is executed in step S907 or S909, in step S910, a processing result is returned.

In step S911, a connection state determination is then made. If the Connection header of the analyzed parameter of the HTTP request received from the web server 151 in step S902 is "close" indicating disconnection (YES in step S911), the processing proceeds to step S912. Then, in step S912, session information is deleted from the HTTP session management information, and the processing returns to the state of waiting for reception of an HTTP request in step S902. If the Connection header is not "close" indicating disconnection (NO in step S911), to maintain the HTTP session, the processing returns to step S902 to wait for reception of an HTTP request.

FIG. 10 is a sequence diagram illustrating an example of operation of the communication system according to the present exemplary embodiment. In the example, HTTP communication based on IPP over USB is performed between the USB-connected terminal apparatus 200a and the communication apparatus 100, and a series of HTTP requests/responses is transmitted and received.

Prior to a start of the sequence, when the terminal apparatus 200a and the communication apparatus 100 are connected to each other with a USB cable, enumeration has been performed between the terminal apparatus 200a and the communication apparatus 100. In other words, the terminal apparatus 200a recognizes the following attributes that the communication apparatus 100 has. The communication apparatus 100 is a multi-function printer compliant with IPP over USB and includes two interfaces (IPP USB #1 and IPP USB #2) compliant with IPP over USB. Further, the IPP USB #1 includes the BulkOut transfer EP 5 and the BulkIn transfer EP 6, and the IPP USB #2 includes the BulkOut transfer EP 7 and the BulkIn transfer EP 8. At this time, the communication apparatus 100 generates a socket for the IPP USB #1 (socket 1) and a socket for the IPP USB #2 (socket 2), and the sockets stand by in an unused state.

First, transmission and reception of an HTTP request 1 and an HTTP response 1 will be described. In step S1001, when HTTP://localhost:80 is input as an access destination in the web browser 251, a TCP connection is established between the web browser 251 and the proxy 253. Next, in step S1002, the web browser 251 transmits an HTTP request 1. Here, the HTTP request 1 has a "Connection: keep-alive" attribute indicating that the session is maintained.

In step S1003, upon receipt of the HTTP request 1 from the web browser 251, the proxy 253 forwards the HTTP request 1 to the USB host driver 254. In step S1004, the USB host driver 254 performs Bulk Out transfer of the HTTP request 1 to the EP 5 of the IPP USB #1, which is an IPP over USB interface of the communication apparatus 100. In step S1005, when the EP 5 of the IPP USB #1 in the communication apparatus 100 receives data, the proxy 157 is notified of the reception.

Since the socket 1 is in the unused state at this time, the proxy 157, which has received the notification of the data reception, notifies the web server 151 of a connection event and sets the socket 1 to an in-use state. The web server 151, which has received the notification of the connection event, performs the connection processing of step S704.

The main thread takes out the head thread (sub-thread 1) from the sub-thread queue, associates the socket 1 with the head thread, and causes the sub-thread 1 to perform subsequent transmission and reception. In step S1006, when the sub-thread 1 tries to read data from the socket 1, the proxy 157 passes the received data read from a first-in first-out (FIFO) memory of the EP 5 to the sub-thread 1.

In step S1007, when the sub-thread 1 of the web server 151 receives (S802) and analyzes (S804) the request line and the header of the HTTP request 1, the sub-thread 1 delegates the execution of the processing to the web application 152 (S806).

In step S1008, upon receipt of the HTTP request 1, the web application 152 performs processing of the HTTP request 1. More specifically, the HTTP session management information is scanned (S903), and the following determinations are made. In step S904, since the HTTP session of the socket 1 does not exist at this time (NO in step S904), the processing proceeds to step S905. Then in step S905, since the socket 1 is the socket for the IPP USB #1 (YES in step S905), the processing proceeds to step S906. In step S906, since the socket 2 is in an unused state at this time and there is no USB-connected session (NO in step S906), the processing proceeds to step S908. In step S908, the session is registered as a new session. Subsequently, in step S909, the HTTP request 1 is processed as a request in the new session.

Subsequently, in step S1009, the processing result is returned to the sub-thread 1 of the web server 151 (S910). Since the HTTP request 1 has the "Connection: keep-alive" attribute (NO in step S911), the processing returns to the state of waiting for reception of an HTTP request in step S902.

In step S1010, the sub-thread 1 that has received the processing result of the HTTP request 1 from the web application 152 generates an HTTP response 1 (S807) and transmits the HTTP response 1 to the socket 1 (S808).

Since the HTTP response 1 has the "Connection: keep-alive" attribute (NO in step S809), the processing returns to the reception process of the request line and the header of step S802.

In step S1011, upon receipt of the HTTP response 1 transmitted by the web server 151, the proxy 157 writes the HTTP response 1 to the FIFO memory of the EP 6 of the IPP USB #1, and in step S1012, the proxy 157 performs Bulk In transfer of the HTTP response 1.

In step S1013, upon receiving the Bulk In transfer of the EP 6, the USB host driver 254 transfers the received data to the proxy 253. In step S1014, the proxy 253 transmits the HTTP response 1 to the web browser 251. By the above sequence, the transmission and reception of the HTTP request 1 and the HTTP response 1 are completed.

Next, transmission and reception of an HTTP request 2 and an HTTP response 2 will be described. In step S1015, upon receiving the HTTP response 1, the web browser 251 subsequently transmits the HTTP request 2 that is a series of requests in the session of the HTTP request 1. Here, the HTTP request 2 has the "Connection: keep-alive" attribute indicating that the session is maintained.

In step S1016, upon receipt of the HTTP request 2 from the web browser 251, the proxy 253 forwards the HTTP request 2 to the USB host driver 254. In step S1017, when the HTTP request 2 is received from the proxy 253, the USB host driver 254 performs Bulk Out transfer of the HTTP request 2 to the EP 7 of the IPP USB #2.

In the communication apparatus 100, in step S1018, when the data is received by the EP 7 of the IPP USB #2, the proxy 157 is notified of the reception. Since the socket 2 is in the unused state at this time, the proxy 157, which has received the notification of the data reception, notifies the web server 151 of a connection event and sets the socket 2 to the in-use state. The web server 151, which has received the notification of the connection event, performs the connection processing of step S704. The main thread takes out the head thread (sub-thread 2) from the sub-thread queue, associates the socket 2 with the head thread, and causes the sub-thread 2 to perform subsequent transmission and reception. In step S1019, when the sub-thread 2 tries to read the data from the socket 2, the proxy 157 passes the received data read from the FIFO memory of the EP 7 to the sub-thread 2.

In step S1020, when the sub-thread 2 of the web server 151 receives (S802) and analyzes (S804) the request line and the header of the HTTP request 2, the sub-thread 2 delegates execution of the processing to the web application 152 (S806).

In step S1021, upon receipt of the HTTP request 2, the web application 152 performs processing of the HTTP request 2. More specifically, the HTTP session management information is scanned (S903), and the following determinations are made. In step S904, since the HTTP session of the socket 2 does not exist at this time (NO in step S904), the processing proceeds to step S905. Then, in step S905, since the socket 2 is a socket for the IPP USB #2 (YES in step S905), the processing proceeds to step S906. In step S906, since there is a USB-connected session using the socket 1 at this time (YES in step S906), the processing proceeds to step S907. Subsequently, in step S907, the HTTP request 2 is processed as a series of requests in the session of the HTTP request 1.

Subsequently, in step S1022, the processing result is returned to the sub-thread 2 of the web server 151 (S910). Since the HTTP request 2 has the "Connection: keep-alive" attribute (NO in step S911), the processing returns to the state of waiting for reception of an HTTP request in step S902.

In step S1023, the sub-thread 2 that has received the processing result of the HTTP request 2 from the web application 152 generates an HTTP response 2 (S807) and transmits the HTTP response 2 to the socket 2 (S808).

Since the HTTP response 2 has the "Connection: keep-alive" attribute (NO in step S809), the processing returns to the reception process of the request line and the header of step S802.

In step S1024, upon receipt of the HTTP response 2 transmitted by the web server 151, the proxy 157 writes the HTTP response 2 to the FIFO memory of the EP 8 of the IPP USB #2, and in step S1025, the proxy 157 performs Bulk In transfer of the HTTP response 2. In step S1026, upon receiving the Bulk In transfer of the EP 8, the USB host driver 254 transfers the received data to the proxy 253. In step S1027, the proxy 253 transmits the HTTP response 2 to the web browser 251. By the above sequence, the transmission and reception of the HTTP request 2 and the HTTP response 2 are completed.

Next, transmission and reception of an HTTP request 3 and an HTTP response 3 will be described. In step S1028, upon receipt of the HTTP response 2, the web browser 251 subsequently transmits the HTTP request 3 that is a series of requests in the session of the HTTP requests 1 and 2. Here, the HTTP request 3 has the "Connection: close" attribute indicating that the session is to be disconnected.

In step S1029, upon receipt of the HTTP request 3 from web browser 251, the proxy 253 forwards the HTTP request 3 to the USB host driver 254. In step S1030, when the HTTP request 3 is received from the proxy 253, the USB host driver 254 performs Bulk Out transfer of the HTTP request 3 to the EP 5 of the IPP USB #1.

In the communication apparatus 100, in step S1031, when the data is received by the EP 5 of the IPP USB #1, the proxy 157 is notified of the reception. In step S1032, the proxy 157, which has received the notification, passes the received data read from the FIFO memory of the EP 5 to the sub-thread 1. Here, since the sub-thread 1 that has processed the HTTP request 3 is waiting for reception by using the socket 1, the proxy 157 does not notify the web server 151 of the connection event.

In step S1033, when the sub-thread 1 of the web server 151 receives (S802) and analyzes (S804) the request line and the header of the HTTP request 3, the sub-thread 1 delegates execution of the processing to the web application 152 (S806).

In step 1034, upon receipt of the HTTP request 3, the web application 152 performs processing of the HTTP request 3. More specifically, the HTTP session management information is scanned (S903), and the following determinations are made. In step S904, since the HTTP session of the socket 1 exists at this time (YES in step S904), the processing proceeds to step S907. Subsequently, in step S907, the HTTP request 3 is processed as a series of requests in the session of the HTTP requests 1 and 2.

Subsequently, in step S1035, the processing result is returned to the sub-thread 1 of the web server 151 (S910). Since the HTTP request 3 has the "Connection: close" attribute (YES in step S911), the processing proceeds to step S912. In step S912, the corresponding session information is deleted from the HTTP session management information, and then, the processing returns to the state of waiting for reception of an HTTP request in step S902.

In step S1036, the sub-thread 1 that has received the processing result of the HTTP request 3 from the web application 152 generates an HTTP response 3 (S807) and transmits the HTTP response 3 to the socket 1 (S808).

Since the HTTP response 3 has the "Connection: close" attribute (YES in step S809), the processing proceeds to step S810. In step S810, the socket 1 is closed to disconnect the TCP connection. At this time, since the socket 1 is a socket for the IPP USB #1, the socket 1 is only brought into an unused state by the proxy 157, and is not actually closed. In addition, at this time, the proxy 157 generates a reception error for the sub-thread 2 waiting for reception using the socket 2. Then, in step S803, the sub-thread 2 fails in the reception (NO in step S803), and the processing proceeds to step S810. In step S810, the socket 2 is closed to execute the disconnection processing. Also in this case, since the socket 2 is a socket for the IPP USB #2, the socket 2 is only brought into an unused state by the proxy 157, and is not actually closed.

In step S1037, upon receipt of the HTTP response 3 transmitted by the web server 151, the proxy 157 writes the HTTP response 3 to the FIFO memory of the EP 6 of the IPP USB #1, and in step S1038, the proxy 157 performs Bulk In transfer of the HTTP response 3.

In step S1039, upon receiving the Bulk In transfer of the EP 6, the USB host driver 254 transfers the received data to the proxy 253. In step S1040, the proxy 253 transmits the HTTP response 3 to the web browser 251.

In step S1041, upon receiving the HTTP response 3, the web browser 251 disconnects the TCP connection in accordance with the "Connection: close" attribute, which means disconnection of the session. By the above sequence, the transmission and reception of the HTTP request 3 and the HTTP response 3 are completed.

As described above, according to the exemplary embodiment, it is possible to appropriately perform the HTTP session management in a case where a service in which an HTTP session is maintained is executed. Note the configuration and the procedure of processing described in the exemplary embodiment are merely examples, and the communication line, the protocol, the application, and the determination method that are targets are not limited thereto. In the present exemplary embodiment, the example in which HTTP sessions via IPP over USB are handled as the same session even if the HTTP sessions have different interfaces (IPP USB #1/IPP USB #2) has been described. Furthermore, it is also possible to employ a configuration in which whether the session is handled as the same session or handled as different sessions can be switched depending on the situation.

In addition, by setting the upper limit of the number of sessions that can be registered with the HTTP session management information to one, when there is an established HTTP session, acceptance of an HTTP request of a different session can be prevented, i.e., a configuration that allows exclusion of a service may be employed.

Further, in the exemplary embodiment, the socket descriptor is used to determine whether corresponding HTTP sessions are the same in the present exemplary embodiment, it is also possible to employ a configuration in which a sub-thread for IPP over USB communication is exclusively allocated, and whether the USB connection is made is identified with a thread ID.

In other words, embodiments of the present disclosure are not limited to only the above-described exemplary embodiment, and features can be appropriately changed within the scope of the claims and a scope equivalent to the scope of the claims as long as it is based on technical ideas presented in the present disclosure.

According to various embodiments of the present disclosure, it is possible to appropriately implement session management in a case where a service in which a session is maintained is executed.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure describes exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-170312, filed Oct. 25, 2022, which is hereby incorporated by reference herein in its entirety.

What is claimed is:

1. A communication apparatus that performs communication with a terminal apparatus using a request/response protocol, the communication apparatus comprising:
at least one memory and at least one processor which function as:
a server unit configured to receive a request and transmit a response via a first communication line including at least two logical interfaces and a second communication line different from the first communication line; and
an application configured to process a predetermined request,
wherein the application includes:
an identification unit configured to identify a communication line through which a first request and a second request are received; and a determination unit configured to identify communication endpoints having received the first request and the second request, and determine whether the communication endpoints are same, and wherein, in a case where the determination unit determines that the communication endpoints having received the first request and the second request are not same communication endpoints and the identification unit determines that a communication line having received the first request and the second request is the first communication line, the first request and the second request are processed as a series of requests in a same session.

2. The communication apparatus according to claim 1, wherein the first communication line is a universal serial bus (USB), and wherein the at least two logical interfaces are logical interfaces compliant with Internet Printing Protocol (IPP) over USB.

3. The communication apparatus according to claim 1, wherein the second communication line is a Transmission Control Protocol/Internet Protocol (TCP/IP) network.

4. The communication apparatus according to claim 1, wherein the request/response type protocol is Hyper Text Transfer Protocol (HTTP).

5. A communication apparatus that performs communication with a terminal apparatus using a request/response protocol, the communication apparatus comprising:

at least one memory and at least one processor which function as:

a multi-thread server unit configured to receive a request and transmit a response via a first communication line including at least two logical interfaces, and a second communication line different from the first communication line; and an application configured to process a predetermined request, wherein the application includes:

an identification unit configured to identify a communication line through which the first request and the second request are received; and a determination unit configured to identify threads having processed the first request and the second request, and determine whether the threads are same, and wherein, in a case where the determination unit determines that the threads having processed the first request and the second request are not the same thread and the identification unit determines that a communication line having received the first request and the second request is the first communication line, the first request and the second request are processed as a series of requests in a same session.

6. A method for controlling a communication apparatus that performs communication with a terminal apparatus using a request/response protocol, the method comprising:

receiving a request and transmitting a response via a first communication line including at least two logical interfaces and a second communication line different from the first communication line; and processing a predetermined request by an application, wherein the processing includes:

identifying a communication line through which a first request and a second request are received; and identifying communication endpoints having received the first request and the second request, and determining whether the communication endpoints are same, and wherein, in a case where it is determined in the determining that the communication endpoints having received the first request and the second request are not same communication endpoints and it is determined in the identifying that a communication line having received the first request and the second request is the first communication line, the first request and the second request are processed as a series of requests in a same session.

7. A method for controlling a communication apparatus that performs communication with a terminal apparatus using a request/response protocol, the method comprising:

receiving a request and transmitting a response via a first communication line including at least two logical interfaces and a second communication line different from the first communication line; and processing a predetermined request by an application, wherein the application includes:

identifying a communication line through which a first request and a second request are received; and identifying threads having processed the first request and the second request, and determining whether the threads are same, and wherein, in a case where it is determined in the determining that the threads having received the first request and the second request are not same threads and it is determined in the identifying that a communication line having received the first request and the second request is the first communication line, the first request and the second request are processed as a series of requests in a same session.

* * * * *